(12) United States Patent
Lee

(10) Patent No.: US 9,207,669 B2
(45) Date of Patent: Dec. 8, 2015

(54) POWER SAVING APPARATUS, POWER SAVING SYSTEM AND METHOD OF OPERATING THE SAME

(75) Inventor: Yu-Lung Lee, Miaoli County (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 43 days.

(21) Appl. No.: 12/727,417

(22) Filed: Mar. 19, 2010

(65) Prior Publication Data

US 2011/0187489 A1    Aug. 4, 2011

(30) Foreign Application Priority Data

Feb. 3, 2010    (TW) ................................. 99103156 A

(51) Int. Cl.
  *G05B 23/02*    (2006.01)
  *G08B 5/22*    (2006.01)
  *G08B 21/00*    (2006.01)

(52) U.S. Cl.
  CPC ...................................... *G05B 23/02* (2013.01)

(58) Field of Classification Search
  USPC .......................................................... 340/3.1
  See application file for complete search history.

(56) References Cited

U.S. PATENT DOCUMENTS

| | | | |
|---|---|---|---|
| 6,182,232 B1 * | 1/2001 | Klein | 713/340 |
| 6,259,486 B1 * | 7/2001 | Mahvi | 348/553 |
| 6,737,975 B2 * | 5/2004 | Pelletier | 340/573.1 |
| 6,956,498 B1 * | 10/2005 | Gauthier et al. | 340/12.51 |
| 7,017,057 B2 * | 3/2006 | Magee et al. | 713/320 |
| 7,091,471 B2 * | 8/2006 | Wenstrand et al. | 250/221 |
| 7,636,130 B2 | 12/2009 | Chang | |
| 8,629,938 B2 * | 1/2014 | Wong | 348/553 |
| 2005/0258976 A1 * | 11/2005 | Zteng | 340/825.72 |

FOREIGN PATENT DOCUMENTS

| | | |
|---|---|---|
| CN | 20118866 Y | 1/2009 |
| EP | 0694244 B2 | 8/2000 |
| TW | M284100 U | 12/2005 |
| TW | M334943 U | 6/2008 |

* cited by examiner

*Primary Examiner* — Jennifer Mehmood
*Assistant Examiner* — John Mortell
(74) *Attorney, Agent, or Firm* — Rosenberg, Klein & Lee

(57) ABSTRACT

A power saving apparatus adapted for electronic equipment is disclosed. The power saving apparatus includes a detection module for detecting a motion of an object in a detection field around the electronic equipment and generating a detection signal, a wireless transceiver unit, and a processing unit for transmitting a control signal to the electronic equipment via the wireless transceiver unit according to the detection signal so as to control the electronic equipment to operate in a working mode or a standby mode.

7 Claims, 3 Drawing Sheets

POWER SAVING APPARATUS, POWER SAVING SYSTEM AND METHOD OF OPERATING THE SAME

BACKGROUND OF THE INVENTION

1. Field of the Invention

The present invention relates to a power saving apparatus. In particular, the present invention relates to a power saving apparatus capable of controlling the electronic equipment to operate in a working or a standby mode according to the motion of the user.

2. Description of Related Art

Greenhouse effect has caused a climate change and brought a global warming. That forces human in the world to reduce greenhouse gas emissions for mitigating the results of greenhouse effect.

ENERGY STAR is a joint program of the Environmental Protection Agency and the Department of Energy helping people save money and protect the environment through energy efficient products and practices.

In addition, the California energy commissioners introduce their own mandatory requirements for electricity-guzzling high-definition television (HDTV) sets. From the beginning of 2011 all new HDTV's with screens measuring up to 58 inches along a diagonal will have to use a third less electricity than today's models. By 2013, their consumption will need to have fallen to half of present levels. The move is expected to save Californians up to $1 billion a year in electricity charges.

Traditional power saving method of TV is passive power saving method such as closing standby power of TV or standby power of peripheral equipment of TV. However, power consumption of TV in a standby mode is limited and changing the specification of TV costs time and money. Since it is impossible replacing old-fashion TV immediately, to improve TV's consumption is very importance.

SUMMARY OF THE INVENTION

One objective of the present invention is to save power according to the presence or absence of a user.

The power saving apparatus adapted for an electronic equipment includes a detection module for detecting a motion of an object in a detection field around the electronic equipment and generating a detection signal, a wireless transceiver unit, and a processing unit for transmits a control signal to the electronic equipment via the wireless transceiver unit according to the detection signal so as to control the electronic equipment to operate in a working mode or a standby mode.

The power saving system includes an electronic equipment, a remote control device for controlling the electronic equipment wirelessly, and a power saving apparatus for receiving a remote control signal from the remote control device and transferring the remote control signal to a control signal when the power saving apparatus operates in a learning mode. The power saving apparatus includes a detection module for detecting a motion of an object in a detection field around the electronic equipment and generating a detection signal, a wireless transceiver unit, and a processing unit for transmitting the control signal to the electronic equipment via the wireless transceiver unit according to the detection signal so as to control the electronic equipment to operate in a working mode or standby mode.

In order to further understand the techniques, means and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1:
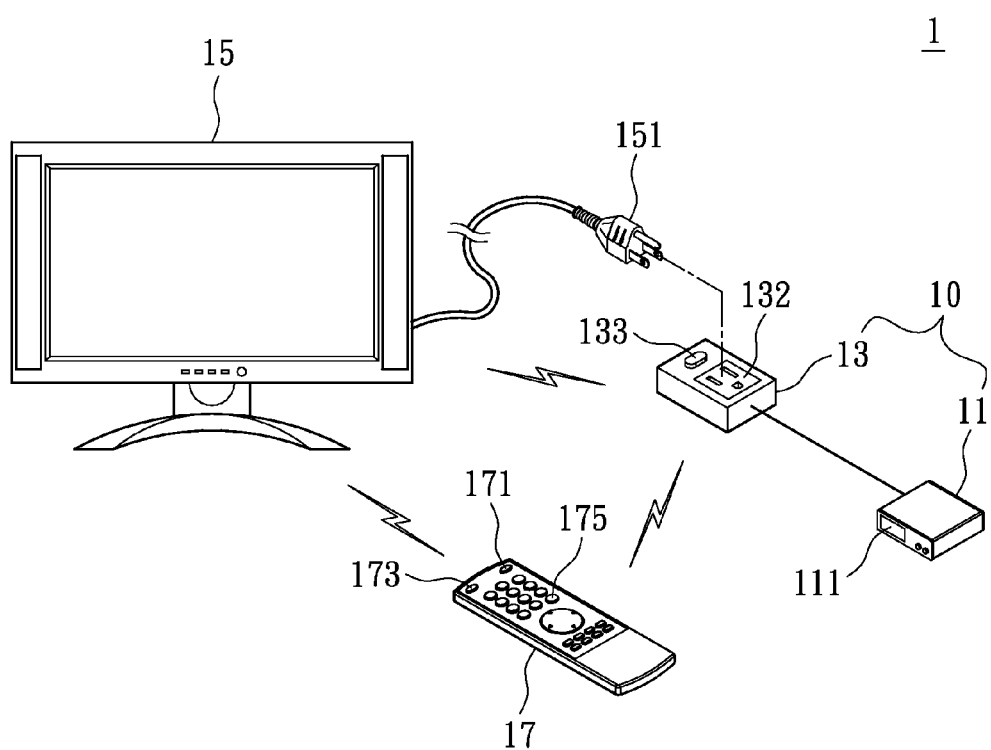
FIG. 1 is a schematic diagram of a power saving system in accordance with one embodiment of the present invention.

FIG. 1 is a schematic diagram of a power saving system in accordance with one embodiment of the present invention. Throughout the disclosure, the power saving system 1 includes a power saving apparatus 10, an electronic equipment 15 and a remote control device 17. The power saving apparatus 10 includes a detection module 11 and a receptacle module 13. The detection module 11 is disposed around the electronic equipment 15 and is oriented to a user for detecting the motion of the user in a predetermined field as a detection field. The detection module 11 transmits a detection signal to the receptacle module 13 according to the detection result via wire or wireless transmission. The receptacle module 13 transmits a control signal to the electronic equipment 15 for controlling the electronic equipment 15 to operate in a working mode or a standby mode according to the detection signal. The control signal includes a starting signal and a stopping signal corresponding to the working mode and the standby mode respectively.

In one implementation, the receptacle module 13 could be an in-wall socket or a strip power socket. The electronic equipment 15 could be a television or other remote control equipment.

The detection module 11 includes a sensing unit 111. The sensing unit 111 could be an image sensing unit or an infrared sensing unit. For instance, the image sensing unit is a charge couple device (CCD) or a complementary metal oxide semiconductor (CMOS), and the infrared sensing unit is a pyroelectric infrared radial sensor (PIR).

When the sensing unit 111 is the image sensing unit, the sensing unit 111 detects a motion of an image in the detection field such as an active or an inactive motion. Thereby, the receptacle module 13 determines whether the user feels sleepy or is awake according to an opening or closing eye. When the sensing unit 111 is the infrared sensing unit, the sensing unit 111 measures infrared light radiating from an object in the detection field. Thereby, the receptacle module 13 determines whether the user departs from or turns to the detection field.

In one implement, the receptacle module 13 has a socket hole 132 for enabling power supply to the electronic equipment 15. An operation unit 133 for receiving a first operating command from the user is configured on the receptacle module 13 or the detection module 11. The receptacle module 13 or the detection module 11 operates in a learning mode upon a receipt of the first operating command. The receptacle module 13 or the detection module 11 retrieves and stores a remote control signal from the remote control device 17. Therefore, the receptacle module 13 or the detection module 11 is capable of controlling the electronic equipment 15 to operate in a working mode or a standby mode by transmitting the remote control signal to the electronic equipment.

In one implement, the detection field of the detection module 11 is near an effective remote control field of the remote control device 17. Sensing range, sensing angle or sensitivity of the detection field of the detection module 11 may be set by the user.

The receptacle module 13 further detects power status of the electronic equipment 15. When the electronic equipment 15 is turned on, the receptacle module 13 detects a variation of the power and triggers the detection module 11 to detect the motion of the user. The receptacle module 13 controls the electronic equipment 15 to operate in the working mode or standby mode according to the detection result. For instance, the receptacle module 13 controls the electronic equipment 15 to operate in the standby mode (i.e. the working power of the electronic equipment 15 is turn off) when the detection module 11 detects the user departing from the detection field or an inactive object in the detection field lasting for a moment. The receptacle module 13 controls the electronic equipment 15 to operate in the working mode when the detection module 11 detects the user turning to the detection field or an active object in the detection field within a predetermined time.

Moreover, if the detection module 11 has detected the user departing from the detection field or the inactive object in the detection field lasting for the predetermined time, the receptacle module 13 turns off the detection module 11 (i.e. the detection module 11 stops detecting and the receptacle module 13 stops controlling the electronic equipment 15).

In one implement, the electronic equipment 15 is a high definition television such as a liquid crystal display, an organic light emission display or a plasma display, or other remotely controllable electronic equipment. The electronic equipment 15 is connected with the receptacle module 13 via a plug 151. When the electronic equipment 15 is connected with power source via the receptacle module 13, the electronic equipment 15 is operating in the standby mode and is controlled by the remote control device 17 or the receptacle module 13.

The remote control device 17 has a plurality of press portions 171, 173 and 175 for receiving a second operating command from the user and transmits the remote control signal to the receptacle module 13 or the electronic equipment 15. The remote control signal is an information packet such as a starting command, a stopping command, a channel command or volume command. The remote control signal contains a serial number, an identification number and a command code.

Figure 2:
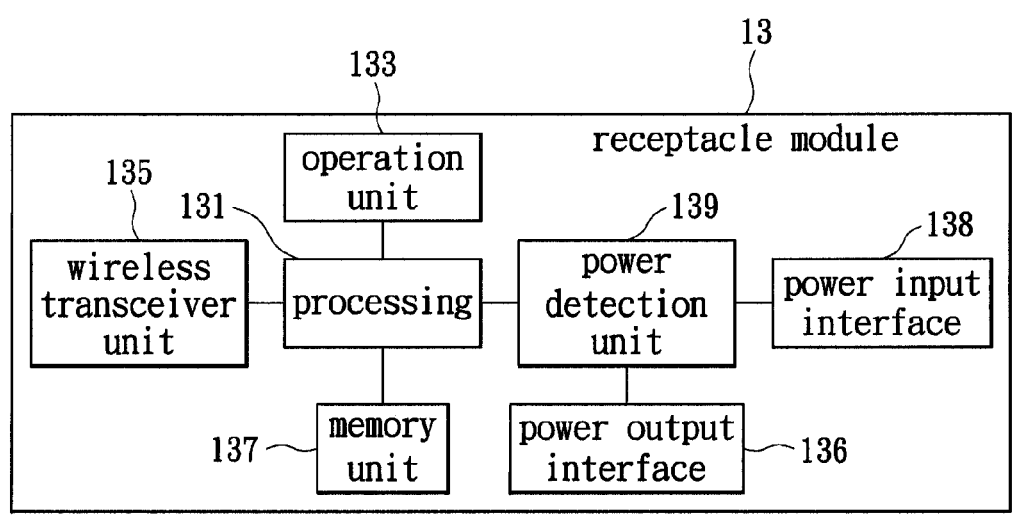
FIG. 2 is a functional block diagram of a receptacle module in accordance with one embodiment of the present invention.

FIG. 2 is a functional block diagram of a receptacle module in accordance with one embodiment of the present invention, and The receptacle module 13 includes a processing unit 131, an operation unit 133, a wireless transceiver unit 135, a power output interface 136, a memory unit 137, a power input interface 138 and a power detection unit 139.

In one implement, the power input interface 138 is an electric wire or plug for connecting with the power supply and transmitting the power supply to the power output interface 136 via the power detection unit 139. The power output interface 136 transmits a steady input power to the electronic equipment 15 or the detection module 11. The power detection unit 139 is configured to detect the power consumption of the electronic equipment 15. The power detection unit 139 may be a current sensor for detecting the current of the input power and determining whether the current of the input power reaches or exceeds a threshold. The threshold is built in the receptacle module 13.

The processing unit 131 controls the receptacle module 13 to operate in the learning mode according to the second operating command retrieved by the operation unit 133. In the learning mode, the receptacle module prompts the user to operate the remote control device 17 via a display (not shown) or an audio output unit (shown) controlled by the processing unit 131. The processing unit 131 receives the remote control signals via the wireless transceiver unit 135 and stores them in the memory 137 when the remote control device 17 transmits the remote control signals to the receptacle module 13.

The processing unit 131 turns on or off the detection module 11 according to the detection result of the power detection unit 139. The processing unit 131 controls the detection module 11 to detect the motion of the use in the detection field when the input power reaches or exceeds the threshold detected by the power detection unit 139. The processing unit 131 determines whether the user in the detection field is asleep or awake, or whether the user departs from or turns to the detection field according to the detection result of the detection module 11. The processing unit 131 transmits the stopping signal to the electronic equipment 15 via the wireless transceiver unit 135 and controls the electronic equipment 15 to operate in the standby mode when the user departs from the detection field.

The processing unit 131 further determines whether the user enters to the detection field within the predetermined time. When the detection module 11 detects the user turning to the detection field within the predetermined time, the processing unit 131 controls the electronic equipment 15 to operate in the working mode by transmitting the starting signal to the electronic equipment 15 via the wireless transceiver unit 135. If the user does not turn to the detection field detected by the detection module 11, the processing unit 131 turns off the detection module 11.

The receptacle module 130 communicates with the detection module 11, the electronic equipment 15 and the remote control device 17 via radio frequency or infrared lighting.

In one implement, the remote control signal is a wireless radio frequency signal or an infrared lighting signal. If the remote control signal is the infrared signal, the wireless transceiver unit 135 is set at the outside of the receptacle module 13 and orient to the user.

The receptacle module 13 stores the remote control signal from the remote control device 17 in the learning mode and controls the electronic equipment 15 to operate in the standby mode or the working mode according to the detection signal from the detection module 11. Thereby, the power saving apparatus 2 saves the working power of the electronic equipment 15 according to the presence or absence of the user in the detection field, and saves the working power of the detection module 11 when the user has departed from the detection field for a long time.

Figure 3:
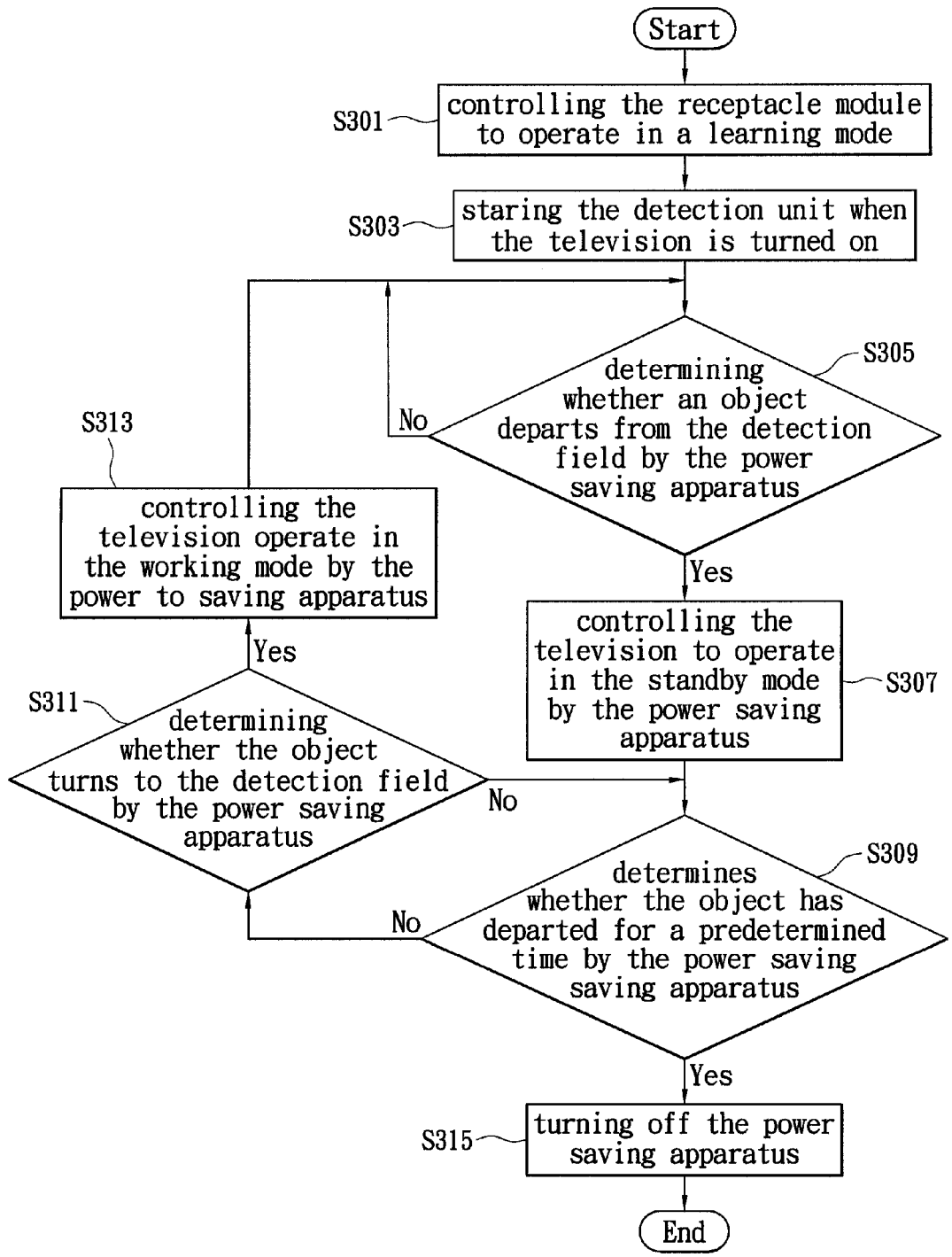
FIG. 3 is a flowchart illustrating a power saving method of the power saving system in accordance with one embodiment of the present invention.

FIG. 3 is a flowchart illustrating a power saving method of the power saving system in accordance with one embodiment of the present invention.

In the beginning, the receptacle module 13 retrieves the remote control signal from the remote control device 17 and stores the remote control signal in the learning mode (S301). The remote control signal includes the starting signal and the stopping signal. When the electronic equipment 15 is turns on, the receptacle module 13 detects the variation of the input power and triggers the detection module 11 (S303). The detection module 11 detects the motion of the user in the detection field such as active and inactive motion. The receptacle module 13 determines whether the user departs from or turns to the detection field according to the detection signal from the detection module 11 (S305). If the user does not depart from the detection field, the detection module 11 detects continuously.

When the user departs from the detection field detected by the detection module 11, the receptacle module 13 controls the electronic equipment 15 to operates in the standby mode by transmitting the stopping signal (S307). The receptacle module 13 determines whether the user has departed from the detection field for the predetermined time or whether the user has been inactive for the predetermined time (S309). The predetermined time is built in the receptacle module 13.

When the user has departed from the detection field for the predetermined time, the receptacle module 13 turns off the detection module 11 (S315). The receptacle module 13 is unable to control the electronic equipment 15 until the next turning on of the electronic equipment 15. If the user does not depart from the detection field for the predetermined time, the detection module 11 detects the motion of the user in the detection field again (S311). When the user turns to the detection field within the predetermined time, the receptacle module 13 controls the electronic equipment 15 to operate in the working mode (S313). The receptacle module 13 determines whether the user departs from or turns to the detection field according to the detection signal from the detection module 11 again (S305).

To sum up, the present invention utilizes an active saving power apparatus to connect with the remotely controllable electronic equipment for saving the working power of the remotely controllable electronic equipment according to the presence or absence of the user.

What are disclosed above are only the specification and the drawings of the preferred embodiment of the present invention and it is therefore not intended that the present invention be limited to the particular embodiment disclosed. It will be understood by those skilled in the art that various equivalent changes may be made depending on the specification and the drawings of the present invention without departing from the scope of the present invention.

What is claimed is:

1. A power saving apparatus adapted for an electronic equipment, and the electronic equipment is connected with a power source via the power saving apparatus, the power saving apparatus comprising:
   a detection module for detecting a presence of a body by detection of motion or infrared light in a detection field around the electronic equipment and generating a detection signal;
   a receptacle module connected with the detection module, the receptacle module comprising:
      a power input interface connected with a power supply;
      a power output interface for transmitting the power source to the electronic equipment and the detection module;
      a power detection unit for detecting a power consumption of the electronic equipment;
      a wireless transceiver unit; and
      a processing unit for transmitting a control signal to the electronic equipment via the wireless transceiver unit according to the detection signal so as to control the electronic equipment to operate in a working mode or a standby mode;
   wherein the receptacle module stores the control signal in a learning mode, and the control signal comprises a starting signal and a stopping signal;
   wherein when the power consumption of the electronic equipment exceeds a predetermined threshold, the processing unit enables the detection module to operate, wherein the electronic equipment is controlled to operate in the standby mode by the processing unit when no longer detecting the presence of the body in the detection field by the detection module, and after the electronic equipment is operated in the standby mode, the detection module is turned off by the processing unit when the detection module has failed to detect the presence of the body for the predetermined period of time.

2. The apparatus as claimed in claim 1, wherein the processing unit transmits the stopping signal as the control signal to control the electronic equipment to operate in the standby mode when the detection module no longer detects the presence of the body in the detection field.

3. The apparatus as claimed in claim 2, wherein the processing unit transmits the starting signal as the control signal to control the electronic equipment to operate in the working mode when the detection module detects the presence of the body in the detection field.

4. A power saving system, comprising:
   an electronic equipment;
   a remote control device for controlling the electronic equipment wirelessly;
   a power saving apparatus connected between a power source and the electronic equipment, the power saving apparatus comprising:
      a detection module for detecting a presence of a body by detection of motion or infrared light in a detection field associated with the electronic equipment and generating a detection signal;
      a receptacle module connected with the detection module, the receptacle module stores the control signal in a learning mode, the receptacle module comprising:
         a power input interface connected with a power supply;
         a power output interface for transmitting the power source to the electronic equipment and the detection module;
         a power detection unit for detecting a power consumption of the electronic equipment;
         a wireless transceiver unit, and
         a processing unit for transmitting a control signal to the electronic equipment via the wireless transceiver unit according to the detection signal so as to control the electronic equipment to operate in a working mode or a standby mode;
   wherein the power saving apparatus receives and stores a remote control signal from the remote control device and transfers the remote control signal to the control signal when the power saving apparatus operates in a learning mode;
   wherein, the control signal comprises a starting signal and a stopping signal, and when the power consumption of the electronic equipment exceeds a predetermined threshold, the processing unit enables the detection module to operate, wherein the electronic equipment is controlled to operate in the standby mode by the processing unit when no longer detecting the presence of the body in the detection field by the detection module, and after the electronic equipment is operated in the standby mode, the detection module is turned off by the processing unit when the detection module has failed to detect the presence of the body for the predetermined period of time.

5. The system as claimed in claim 4, wherein the power saving apparatus further comprises a operation unit for starting the power saving apparatus to operate in the learning mode.

6. A power saving method adapted for an electronic equipment having a power apparatus having a receptacle module and a detection module, and the receptacle module connected between a power supply and the electronic equipment, and the receptacle module for transmitting a power source to the electronic equipment and the detection module, and the receptacle module having a processing unit, the power saving method comprising:
- enabling the electronic equipment, wherein when the electronic equipment is enabled, the processing unit enables the detection module to operate;
- detecting a presence of a body by detection of motion or infrared light in a detection field by the detection module;
- transmitting a control signal to the electronic equipment by the processing unit for controlling the electronic equipment to operate in a working mode or a standby mode wirelessly according to whether detecting the presence of the body in the detection field by the detection module;
- storing the control signal in the receptacle module when in a learning mode, the control signal comprising a starting signal and a stopping signal;
- transmitting the stopping signal as the control signal to the electronic equipment by the processing unit so as to control the electronic equipment to operate in the standby mode when no longer detecting the presence of the body in the detection field by the detection module;
- determining whether the detection module fails to detect the presence of the body in the detection field for a predetermined period of time; and
- turning off the detection module by the processing unit when the detection module has failed to detect the presence of the body for the predetermined period of time.

7. The method as claimed in claim 6, wherein transmitting a starting signal as the control signal by the processing unit when detecting the presence of the body in the detection field by the detection module.

\* \* \* \* \*